United States Patent
Bhaskar et al.

(10) Patent No.: US 8,221,631 B1
(45) Date of Patent: Jul. 17, 2012

(54) AERATION BASIN WITH OFF GAS MONITORING

(75) Inventors: Ravi Bhaskar, Kansas City, MT (US);
Herman Dharmarajah, Morristown, NJ (US); Bill Sheridan, Naperville, IL (US); Sujit V. Gaikwad, Glendale, AZ (US); Sachi K. Dash, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/198,383

(22) Filed: Aug. 4, 2011

(51) Int. Cl.
  *B01F 3/04* (2006.01)
(52) U.S. Cl. ........ 210/739; 210/758; 210/143; 210/150; 210/151; 210/220
(58) Field of Classification Search ........... 210/739, 210/758, 143, 150–151, 220
See application file for complete search history.

(56) References Cited

U.S. PATENT DOCUMENTS

| | | | |
|---|---|---|---|
| 3,942,792 A * | 3/1976 | Topol | 73/19.1 |
| 6,290,850 B1 | 9/2001 | Chatellier et al. | |
| 7,449,113 B2 * | 11/2008 | Jenkins et al. | 210/603 |
| 7,718,066 B2 | 5/2010 | Jenkins et al. | |
| 7,754,082 B2 | 7/2010 | Speece et al. | |
| 2009/0230055 A1 * | 9/2009 | Jenkins et al. | 210/614 |
| 2011/0040390 A1 * | 2/2011 | Blevins et al. | 700/18 |

* cited by examiner

*Primary Examiner* — Chester Barry
(74) *Attorney, Agent, or Firm* — Schwegman, Lundberg & Woessner, P.A.

(57) ABSTRACT

A system and method include providing waste water to a treatment tank, diffusing air into the waste water in the treatment tank to treat the waste water, and measuring $O_2$ percentage in off gas from the waste water having diffused air. Dissolved oxygen in the waste water is measured in further embodiments, and the amount of air diffused into the waste water may be controlled as a function of the measurements.

16 Claims, 3 Drawing Sheets

AERATION BASIN WITH OFF GAS MONITORING

BACKGROUND

Water is becoming a very valuable commodity globally. There is focus on recycling water for reuse. To this end, controls and optimization of waste water treatment plants are gaining importance.

Aeration consumes 50 to 80 percent of operating energy for a waste water plant. The existing plants do not have state of the art controls systems to operate aeration basins at desirable dissolved oxygen concentration. They typically run with blowers at full capacity. As a result, much energy may be wasted in waste water treatment plants.

SUMMARY

A system and method include providing waste water to a treatment tank, diffusing air into the waste water in the treatment tank to treat the waste water, and measuring $O_2$ percentage in off gas from the waste water having diffused air. Dissolved oxygen in the waste water is measured in further embodiments, and the amount of air diffused into the waste water may be controlled as a function of the measurements.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Various embodiments of an aerator and method of measuring $O_2$ in off gas from waste water are described. A hood may be used to collect the off gas, allowing for continuous monitoring of $O_2$ and hence control of devices that affect the amount of $O_2$, such as blowers feeding air diffusers. In further embodiments, diffused oxygen in the waste water may also be measured and used to control the devices.

Figure 1:
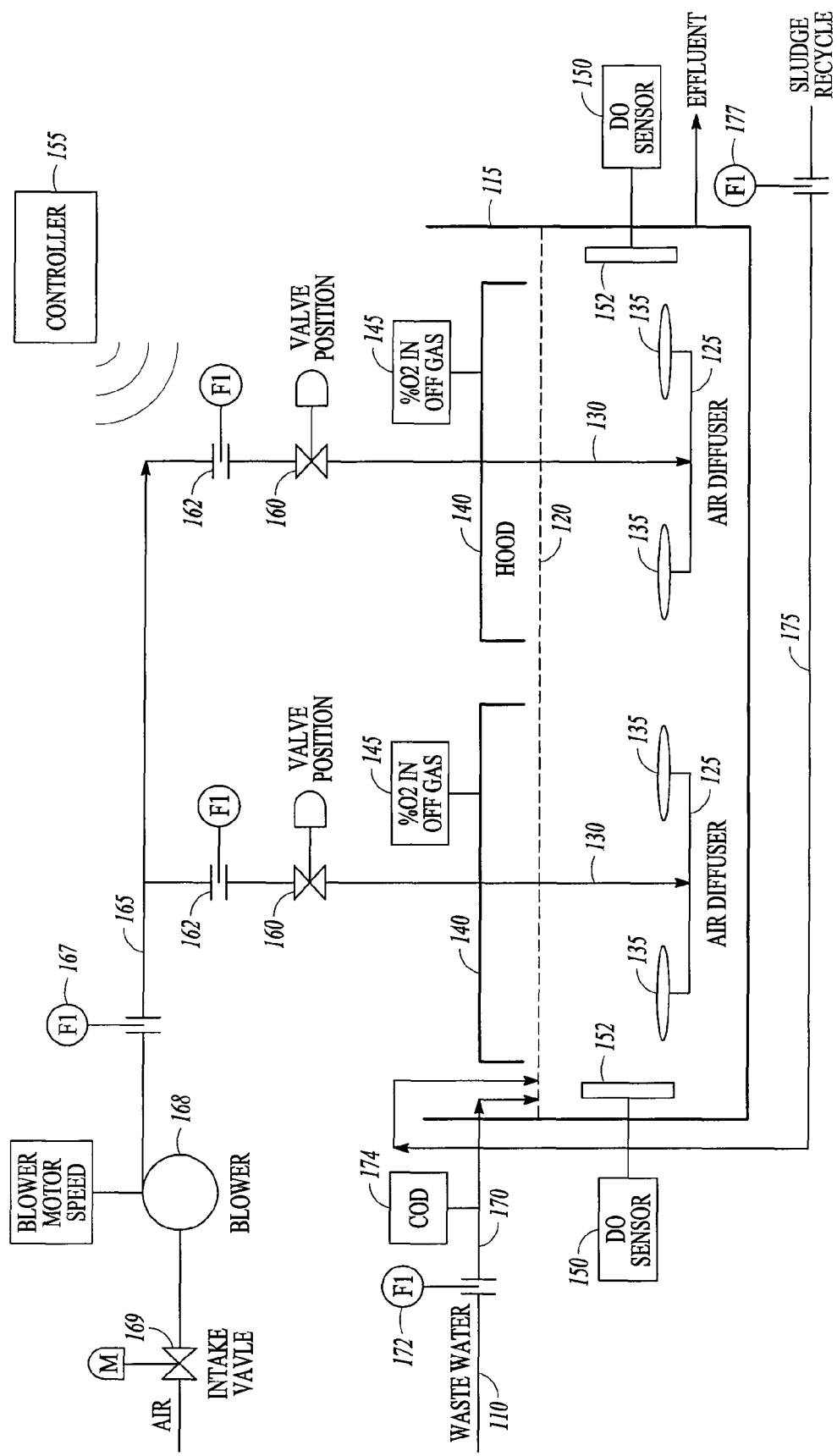
FIG. 1 is a block process flow diagram illustrating an aerator in a waste water treatment plant according to an example embodiment.

A process flow diagram of a system 100 that includes an aerator in a waste water treatment plant is illustrated in FIG. 1. Waste water 110 is provided to a waste water tank 115 to fill an aeration basin or tank 115 to a nominal level represented by broken line 120. One or more air diffusers 125 may be disposed in the tank 115 at a level below the nominal level 120 to diffuse air into the waste water. In some embodiments, there are many air diffusers 125, which are fed by a plurality of air paths 130, each of which may feed one or more diffuser heads 135.

In one embodiment, one or more hoods 140 are positioned over the air diffusers 125 in the tank 115 to capture off gas generated from the waste water being treated. An $O_2$ sensor 145 may be positioned in each hood, or in further embodiments, proximate the waste water in a position exposed to the off gas, in order to measure the $O_2$ content of the off gas.

When a hood is used to capture the off gas, it may be sized as desired to hold sufficient off gas to provide a sample of gas to the $O_2$ sensor that is refreshed in a desired amount of time. If the hood is too large, the sample may not be representative of the $O_2$ in the off gas currently being produced. The use of a hood may be beneficial in more accurately measuring $O_2$ so that less oxygen is wasted. In addition, diffuser performance may be monitored by measuring $O_2$.

In addition to the $O_2$ sensors for off gas, diffused oxygen sensors 150 may be positioned with sensing elements 152 disposed within the waste water in the tank 115. The diffused oxygen sensors 150 provide a measure of the amount of oxygen diffused into the waste water. Both sensors 145 and 150 provide measurement data to a controller 155 via a wired or wireless connection. Controller 155 may also be coupled to control and receive data from numerous other devices in system 100.

The airflow paths 130 may each include a valve 160 and flow meter 162. The controller 155 may receive data from the flow meters 162 and control the valves 160 in the airflow path to each diffuser or set of diffusers 125 based on the amount of $O_2$, either alone, or in combination with the sensed diffused oxygen. The airflow paths 130 may each be coupled to and fed by a main airflow path 165 that also includes a flowmeter 167, blower 168, and intake valve 169. These devices may also be coupled to controller 155 to provide data and receive commands to control the amount of air provided to the airflow paths 130.

Further devices may be installed on a pipe 170 providing waste water 110 to the tank 115. Such devices may also be coupled to the controller to provide data and be controlled. In one embodiment, a flowmeter 172 measures the amount of waste water flowing in pipe 170 that is delivered to the tank 115. A chemical oxygen demand (COD) sensor 174 may also be positioned to sense relative oxygen depletion in the waste water in pipe 170.

In a further embodiment, a sludge recycle pipe or line 175 having a flowmeter 177 is provided to recycle sludge into the waste water. In various embodiments, each of these sensors such as flowmeters and oxygen sensors, and actuators, such as valves and blowers, may be coupled to and provide data to, or receive control signals from the controller 155. In some embodiments, various devices may both receive signals from and provide signals to controller 155.

In one embodiment, the use of an overhead hood above diffusers enables collection of off gas to analyze its oxygen concentration. A waste water treatment plant typically uses these hoods to do offline test for diffuser performance. By using such hoods in real time, not only can real time diffuser performance be monitored, oxygen concentration in off gas may be measured and used to control elements in the system to increase or reduce the oxygen concentration. Online or real time monitoring of diffuser operation allows one to clean the diffuser in a timely manner and thereby ensures good diffuser performance.

In one embodiment, Model Predictive Controls (MPC) with monitoring diffuser performance is used. An MPC, such as controller 155, is used to control the dissolved oxygen and percent oxygen in off gas for all zones of aerobic reactor by adjusting the air flows to individual diffusers 125 while respecting a surge constraint of the blower 168. By sensing $O_2$ in the off gas, further optimization of blower energy utilization may be performed. Over oxygenation in the recycle stream affects performance in an upstream anoxic reactor. At times, the anoxic reactor may be downstream of an aerobic reactor, such as the system 100. By using MPC to maintain dissolved oxygen concentrations at their desired targets, blower power consumption may be minimized. In some systems, the desired targets for dissolved oxygen are levels between approximately 2 to 4 mg/L. Control to 1 to 1.5 mg/L dissolved oxygen may also be used due to better control, allowing a safety factor for anticipated surge loads to be lowered.

In one embodiment, controlled variables include dissolved oxygen readings in all zones of the tank, percentage oxygen in the off gas of all zones, total air flow rate, and blower constraints including a surge limit.

Manipulated variables include air supply valve positions in all zones, blower air intake valve 169 positions, and blower 168 motor speed.

Some disturbance variables include waste water influent rate 172, sludge recycle flow rate 175, and waste water strength (COD) 174.

Figure 2:
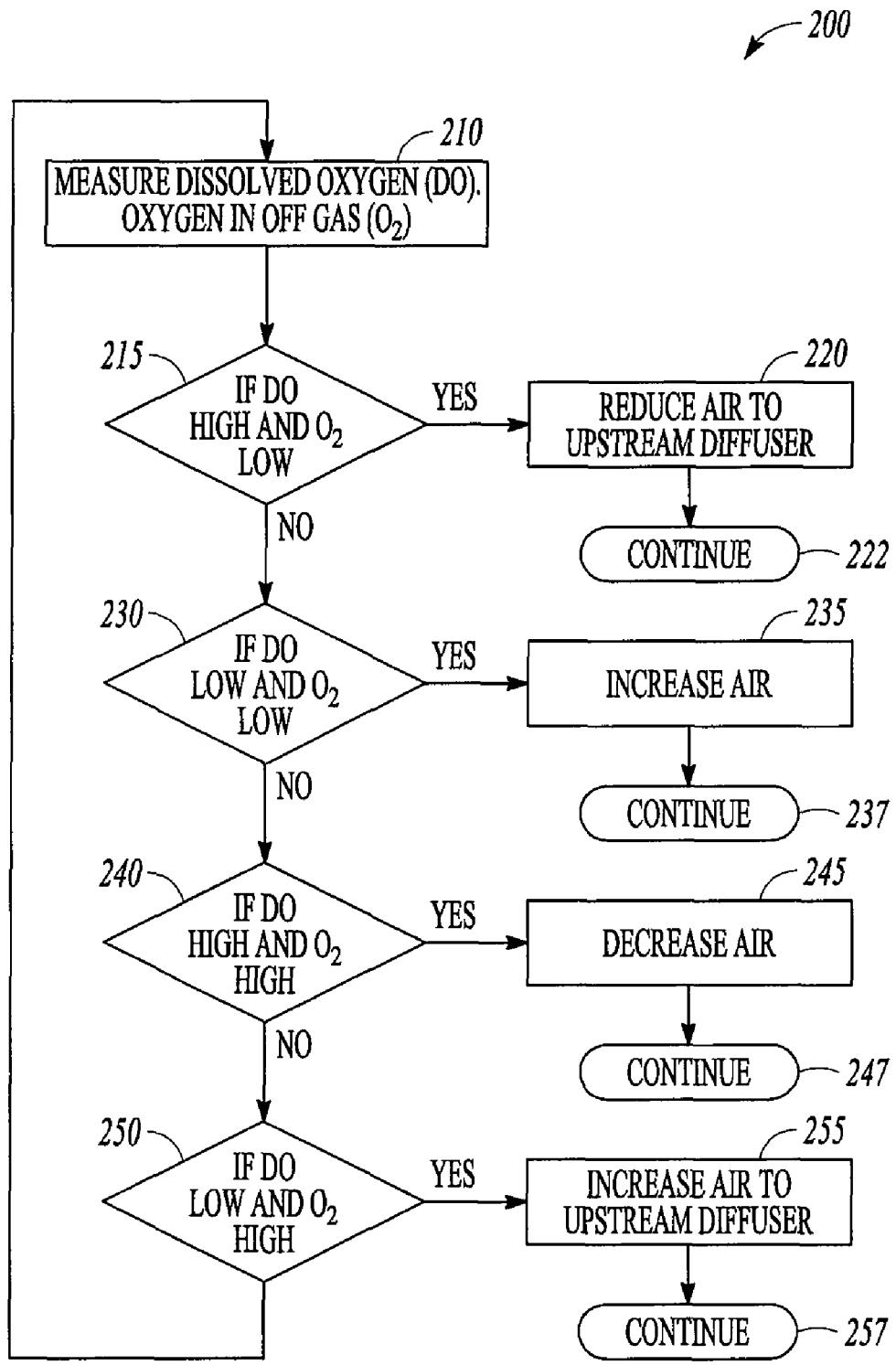
FIG. 2 is a flow chart illustrating a process of controlling an aerator in a waste water treatment plant according to an example embodiment.

The controller 155 uses the variables to control the controlled variables as illustrated at 200 in the flowchart of FIG. 2. The dissolved oxygen (DO) and oxygen in off gas ($O_2$) is measured at 210 via sensors 145 and 150. If the dissolved oxygen is high, and the percent of $O_2$ low at 215, air in an upstream diffuser may be reduced at 220. This condition is fairly unusual. The process continues as indicated at 222 by returning to measuring at 210.

In a more normal situation, the dissolved oxygen is low and the percent $O_2$ is also low at 230, resulting in the controller 155 increasing air flow at 235. This may be done by a combination of control of the air intake valve 169 and blower 168 for all zones. For individual zones, valve 160 for each zone may be actuated to provide desired air flow rates to individual air diffuser zones. The process continues as indicated at 237 by returning to measuring at 210.

If the dissolved oxygen is high and the percent of $O_2$ is also high at 240, the same controls may be used to reduce the air flow to all zones or selective zones at 245. The process continues as indicated at 247 by returning to measuring at 210.

If the dissolved oxygen is low, but the $O_2$ is high at 250, an oxygen transfer problem may exist. The controller 155 will then increase airflow to an upstream diffuser if a model for such a diffuser exists at 255. The process continues as indicated at 257 by returning to measuring at 210. Normal control thus occurs when both dissolved oxygen and $O_2$ are low or high, resulting in direct control of the airflow to each of the diffuser zones. If dissolved oxygen and $O_2$ are within normal ranges, measurements continue at 210. Such measurements may be performed periodically or continuously as execution of the process permits.

In some embodiments, oxygen transfer efficiency (OTEF) may be computed under actual operating conditions. OTEF is a measure of the waste water oxygen transfer efficiency and is expressed as a decimal fraction and may be referred to as alpha, the mass fraction of oxygen transferred per unit of oxygen supplied. The oxygen transfer efficiency may be monitored in a standard manner, and may involve information from temperatures sensors to provide temperature correction and pressure sensors to provide a pressure correction factor for the ratio of local barometric pressure to standard barometric pressure. Factors involved a conversion from clean water to waste water, except alpha, can be specified or reasonable estimated from published, assumed or measured values.

In one embodiment, the following process may be used: To estimate the oxygen transfer efficiency under actual operating conditions in municipal wastewater treatment applications, the following equation is used (ASCE, 1992):

$$OTE_F = \alpha(SOTE)(\Theta^{T-20})(Y\Omega\beta C^{*20}_{20-C})/C^{*20}_{20}$$

Where
    OTEF=Wastewater oxygen transfer efficiency (decimal fraction)
        The mass fraction of oxygen transferred per unit of oxygen supplied.
    α=Alpha (decimal fraction).
        The ratio of mass transfer coefficients, wastewater to clean water.
    Θ=Mass transfer coefficient temperature correction factor (dimensionless). Generally taken to be 1.024.
    T=Process water temperature (° C.)
    Y=Temperature correction factor (dimensionless)

$$(C^*_{bST}/C^*_{b20})$$

Where
    $C^*_{bST}$=Tabulated DO surface saturation value (mg/L) at temperature T.
    Taken from Standard Methods.
    $C^*_{b20}$=Tabulated DO surface saturation value (mg/L) at 20° C.
    Taken from Standard Methods.
    β=Ratio of steady state DO saturation concentration in process and clean water (dimensionless)
    Ω=Pressure correction factor (Pb/Ps) for the steady state DO saturation concentration (dimensionless)
    Where
        Pb=Local barometric pressure for the site (inches of Hg).
        Ps=Standard barometric pressure; 29.92 inches of Hg (101.3 k Pa).
    C=Dissolved oxygen concentration (mg/L)
        Averaged over process water volume being evaluated.

All of the factors involved in the conversion from clean water to wastewater, except alpha, can be specified or reasonably estimated from published, assumed or measured values. A reasonable estimate of alpha may be obtained by performing the process described.

Figure 3:
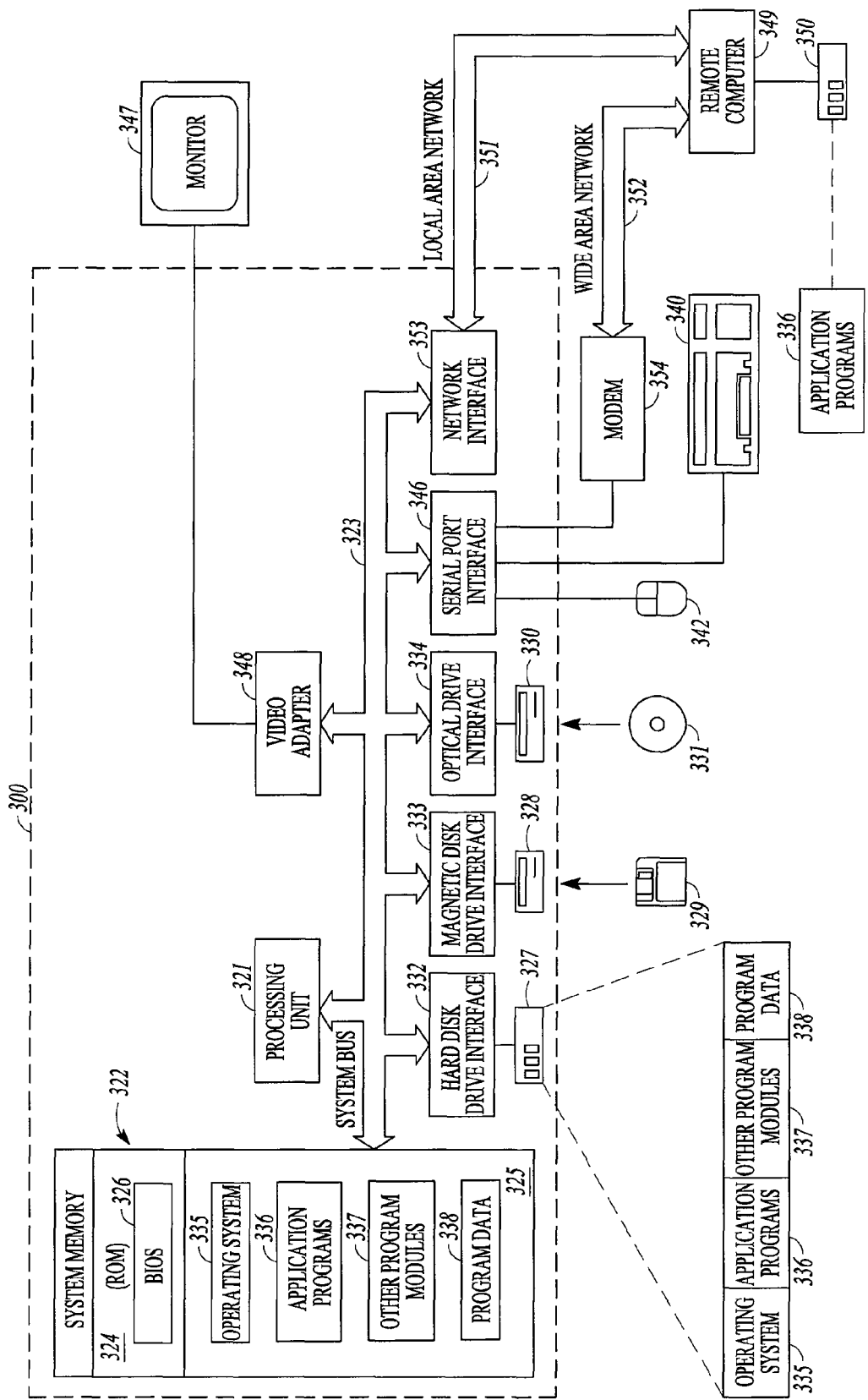
FIG. 3 is a block diagram of a computer system for executing methods according to an example embodiment.

FIG. 3 is a block diagram of a computer system to implement the controller 155 and execute control functions for system 100. In the embodiment shown in FIG. 3, a hardware and operating environment is provided that is applicable to the controller 155, but may contain extra components not needed to implement controller 155.

As shown in FIG. 3, one embodiment of the hardware and operating environment includes a general purpose computing device in the form of a computer 300 (e.g., a personal computer, workstation, or server), including one or more processing units 321, a system memory 322, and a system bus 323 that operatively couples various system components including the system memory 322 to the processing unit 321. There may be only one or there may be more than one processing unit 321, such that the processor of computer 300 comprises a single central-processing unit (CPU), or a plurality of processing units, commonly referred to as a multiprocessor or parallel-processor environment. In various embodiments, computer 300 is a conventional computer, a distributed computer, or any other type of computer.

The system bus 323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 324 and random-access memory (RAM) 325. A basic input/output system (BIOS) program 326, containing the basic routines that help to transfer information between elements within the computer 300, such as during start-up, may be stored in ROM 324. The computer 300 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD ROM or other optical media.

The hard disk drive 327, magnetic disk drive 328, and optical disk drive 330 couple with a hard disk drive interface 332, a magnetic disk drive interface 333, and an optical disk drive interface 334, respectively. The drives and their associated computer-readable media provide non volatile storage of computer-readable instructions, data structures, program modules and other data for the computer 300. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 329, optical disk 331, ROM 324, or RAM 325, including an operating system 335, one or more application programs 336, other program modules 337, and program data 338. Programming for implementing one or more processes or method described herein may be resident on any one or number of these computer-readable media.

A user may enter commands and information into computer 300 through input devices such as a keyboard 340 and pointing device 342. Other input devices (not shown) can include a microphone, joystick, game pad, satellite dish, scanner, or the like. These other input devices are often connected to the processing unit 321 through a serial port interface 346 that is coupled to the system bus 323, but can be connected by other interfaces, such as a parallel port, game port, or a universal serial bus (USB). A monitor 347 or other type of display device can also be connected to the system bus 323 via an interface, such as a video adapter 348. The monitor 347 can display a graphical user interface for the user. In addition to the monitor 347, computers typically include other peripheral output devices (not shown), such as speakers and printers.

The computer 300 may operate in a networked environment using logical connections to one or more remote computers or servers, such as remote computer 349. These logical connections are achieved by a communication device coupled to or a part of the computer 300; the invention is not limited to a particular type of communications device. The remote computer 349 can be another computer, a server, a router, a network PC, a client, a peer device or other common network node, and typically includes many or all of the elements described above I/O relative to the computer 300, although only a memory storage device 350 has been illustrated. The logical connections depicted in FIG. 3 include a local area network (LAN) 351 and/or a wide area network (WAN) 352. Such networking environments are commonplace in office networks, enterprise-wide computer networks, intranets and the internet, which are all types of networks.

When used in a LAN-networking environment, the computer 300 is connected to the LAN 351 through a network interface or adapter 353, which is one type of communications device. In some embodiments, when used in a WAN-networking environment, the computer 300 typically includes a modem 354 (another type of communications device) or any other type of communications device, e.g., a wireless transceiver, for establishing communications over the wide-area network 352, such as the internet. The modem 354, which may be internal or external, is connected to the system bus 323 via the serial port interface 346. In a networked environment, program modules depicted relative to the computer 300 can be stored in the remote memory storage device 350 of remote computer, or server 349. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

By controlling water treatment plants at targets while respecting system constraints, many plants could save 30 percent or more on energy costs. For large waste water treatment plants, energy savings could be up to one million dollars per year or more.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   providing waste water to a treatment tank;
   diffusing air into the waste water in the treatment tank to treat the waste water;
   measuring $O_2$ percentage in off gas from the waste water having diffused air;
   measuring dissolved oxygen in the waste water treatment tank;
   measuring the amount of waste water flowing in the waste water inlet pipe that is to be delivered to the waste water treatment tank;
   measuring chemical oxygen depletion in the waste water in the waste water inlet pipe; and
   controlling the amount of air diffused into the waste water in the treatment plant as a function of the measured dissolved oxygen in the waste water treatment tank, the chemical oxygen depletion in the waste water in the waste water inlet pipe, and the amount of waste water flowing in the waste water inlet pipe.

2. A method comprising:
providing waste water to a treatment tank;
diffusing air into the waste water in the treatment tank to treat the waste water; and
measuring $O_2$ percentage in off gas from the waste water having diffused air wherein the off gas is captured and $O_2$ percentage measured in a hood while the waste water is being treated, wherein the hood is positioned entirely above a surface of the waste water.

3. The method of claim 1 and further comprising measuring the air flow rate corresponding to diffusing air into the waste water in the treatment tank.

4. The method of claim 3 and further comprising controlling the amount of air diffused into the waste water in the treatment plant as a function of the measured $O_2$ percentage and the measured dissolved oxygen in the waste water.

5. The method of claim 1 and further comprising providing the air that is diffused into the waste water via a blower and valve.

6. The method of claim 1 wherein $O_2$ percentage of off gas is measured in multiple zones of the treatment tank.

7. The method of claim 1 and further comprising:
measuring dissolved oxygen in the waste water;
measuring an amount of air diffused into the waste water; and
controlling a blower speed in an air path that provides the air diffused in the waste water.

8. The method of claim 7 and further comprising controlling a valve in the air path.

9. A system comprising:
a waste water treatment tank to receive waste water;
an air diffuser disposed in the waste water treatment tank to diffuse air into waste water in the treatment tank;
an $O_2$ sensor disposed above a waste water level in the waste water treatment tank to measure a percentage of $O_2$ in off gas from the waste water;
a dissolved oxygen sensor positioned to sense dissolved oxygen in the waste water treatment tank;
a flowmeter positioned in the waste water inlet pipe to measure the amount of waste water flowing in the inlet pipe that is to be delivered to the waste water tank; and
a chemical oxygen demand sensor positioned to sense relative oxygen depletion in the waste water in the waste water inlet pipe.

10. The system of claim 9 and further comprising a hood placed to receive off gas from waste water in the waste water treatment tank and to support the $O_2$ sensor.

11. The system of claim 9 wherein the air diffuser includes an air path having a valve, a flow meter, and a blower.

12. The system of claim 9 and further comprising a controller to control the valve and blower as a function of the measured O2 and dissolved oxygen.

13. The system of claim 12 wherein the controller is operable to increase air when measured off gas $O_2$ and measured dissolved oxygen are lower than normal values and to reduce air when measured off gas $O_2$ and measured dissolved oxygen are higher than normal values.

14. A computer readable storage device having instructions for causing a computer to execute a method, the method comprising:
receiving measured $O_2$ values corresponding to off gas from the waste water in a waste water treatment tank, where the waste water has diffused air flow from an air flow path;
receiving measured dissolved oxygen values corresponding to dissolved oxygen in the waste water treatment tank;
receiving measured oxygen depletion values in the waste water in the waste water inlet pipe;
receiving measured values for the amount of waste water flowing in the waste water inlet pipe; and
controlling air flow in the waste water treatment tank via the air flow path as a function of the oxygen demand in the waste water in the waste water inlet pipe, of the measured $O_2$ and dissolved oxygen in the waste water treatment tank, and as a function of the amount of waste water flowing in the waste water inlet pipe.

15. The computer readable storage device of claim 14 wherein air flow is controlled via controlling a valve in the air flow path and a blower in the air flow path.

16. The computer readable storage device of claim 15 wherein air flow is increased if dissolved oxygen and off gas $O_2$ are low, and wherein air flow is reduced if dissolved oxygen and off gas $O_2$ are high.

\* \* \* \* \*